United States Patent
Bansal et al.

(10) Patent No.: US 9,378,042 B2
(45) Date of Patent: *Jun. 28, 2016

(54) VIRTUAL MACHINE MULTICAST/BROADCAST IN VIRTUAL NETWORK

(71) Applicant: MICROSOFT TECHNOLOGY LICENSING, LLC, Redmond, WA (US)

(72) Inventors: Deepak Bansal, Redmond, WA (US); Parveen Patel, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/659,966

(22) Filed: Mar. 17, 2015

(65) Prior Publication Data

US 2015/0193255 A1 Jul. 9, 2015

Related U.S. Application Data

(63) Continuation of application No. 13/649,036, filed on Oct. 10, 2012, now Pat. No. 8,989,183.

(51) Int. Cl.
| | |
|---|---|
| H04L 12/56 | (2006.01) |
| G06F 9/455 | (2006.01) |
| G06F 9/54 | (2006.01) |
| H04L 12/46 | (2006.01) |

(52) U.S. Cl.
CPC ............ *G06F 9/45558* (2013.01); *G06F 9/542* (2013.01); *G06F 9/546* (2013.01); *H04L 12/465* (2013.01); *G06F 2009/45595* (2013.01)

(58) Field of Classification Search
None
See application file for complete search history.

(56) References Cited

U.S. PATENT DOCUMENTS

| | | |
|---|---|---|
| 7,802,000 B1 | 9/2010 | Huang et al. |
| 2008/0183853 A1 | 7/2008 | Manion et al. |
| 2008/0250407 A1 | 10/2008 | Dadhia et al. |
| 2008/0256232 A1 | 10/2008 | Fleury et al. |

(Continued)

OTHER PUBLICATIONS

Zhang, et al., "Cross-Layer Modeling for QoS-Driven Multimedia Multicast/Broadcast over Fading Channels in Mobile Wireless Networks", in IEEE Communications Magazine, vol. 45, Issue 8, Aug. 2007, 9 pages.

(Continued)

*Primary Examiner* — Kwang B Yao
*Assistant Examiner* — Juvena Loo
(74) *Attorney, Agent, or Firm* — Ben Tabor; Harri Vallo; Micky Minhas

(57) ABSTRACT

The performance of multicast and/or broadcasting between virtual machines over a virtual network. A source hypervisor accesses a network message originated from a source virtual machine, and uses the network message to determine a virtual network address associated with destination virtual machines (after potentially resolving group virtual network addresses). Using each virtual network address, the hypervisor determines a physical network address of the corresponding hypervisor that supports the destination virtual machine, and also determines a unique identifier for the destination virtual machine. The source hypervisor may then dispatch the network message along with the unique identifier to the destination hypervisor over the physical network using the physical network address of the hypervisor. The destination hypervisor passes the network message to the destination virtual machine identified by the unique identifier.

20 Claims, 10 Drawing Sheets

(56) References Cited

U.S. PATENT DOCUMENTS

| | | | |
|---|---|---|---|
| 2009/0083445 A1* | 3/2009 | Ganga | G06F 15/16 709/250 |
| 2009/0129385 A1 | 5/2009 | Wray et al. | |
| 2009/0207840 A1 | 8/2009 | McCanne | |
| 2010/0034130 A1 | 2/2010 | So et al. | |
| 2010/0107162 A1* | 4/2010 | Edwards | G06F 9/5077 718/1 |
| 2010/0257269 A1* | 10/2010 | Clark | G06F 9/4856 709/226 |
| 2010/0329253 A1 | 12/2010 | Srinivasan et al. | |
| 2011/0299537 A1 | 12/2011 | Saraiya et al. | |
| 2012/0155462 A1 | 6/2012 | Arroyo et al. | |
| 2012/0275328 A1 | 11/2012 | Iwata et al. | |
| 2013/0034094 A1 | 2/2013 | Cardona et al. | |
| 2013/0266019 A1* | 10/2013 | Qu | H04L 49/70 370/395.53 |
| 2013/0272133 A1 | 10/2013 | Yalagandula et al. | |

OTHER PUBLICATIONS

"7100 Series 10G SFP Data Center Switches", Available at least as early as Jul. 23, 2012. Available at <<http:/ www.seicom-muc.de/global/pdf/Datasheets/Arista/7100_Datasheet.pdf>>.

Office Action dated Jun. 4, 2014 cited in U.S. Appl. No. 13/649,036.

Notice of Allowance dated Nov. 19, 2014 cited in U.S. Appl. No. 13/649,036.

* cited by examiner

*900*

*901*

| Virtual Network Address | Hypervisor Physical Network Address | VM Unique Identifier |
|---|---|---|
| 321 | 541 | A |
| 322 | 543 | B |
| 323 | 543 | C |
| 324 | 541 | D |
| 325 | 542 | E |

901A → (row 1), 901B → (row 2), 901C → (row 3), 901D → (row 4), 901E → (row 5)

*902*

| Virtual Network Address | Constituent Virtual Network Addresses |
|---|---|
| 302 | 324, 325 |

*Figure 9*

VIRTUAL MACHINE MULTICAST/BROADCAST IN VIRTUAL NETWORK

CROSS-REFERENCE TO RELATED APPLICATIONS

This application is a continuation of U.S. patent application Ser. No. 13/649,036 filed on Oct. 10, 2012, entitled "VIRTUAL MACHINE MULTICAST/BROADCAST IN VIRTUAL NETWORK," which issued as U.S. Pat. No. 8,989,183 on Mar. 24, 2015, and which application is expressly incorporated herein by reference in its entirety.

BACKGROUND OF THE INVENTION

A virtual machine is code that performs the logic of an operating system and potentially a set of one or more applications as well. However, instead of such logic being performed on a client computing system (the "client") that actually renders the associated user interface, the virtual machine executes on a host computing system (the "host").

In operation, the virtual machine generates images and/or rendering instructions representing the user interface (such as a desktop or application user interface) to be rendered on the client, and causes the host to transmit the same to the client. The client receives the image and/or rendering instructions, and renders the user interface accordingly. The client also receives user input and transmits the same to the host. The virtual machine processes the input and changes the virtual machine state. If such change in state causes a change to the user interface, the changes are transmitted to the client for further rendering. This process repeats rather quickly, and the response time is sufficiently fast, that the user of the client might not be even able to distinguish whether the operating system and perhaps the associated applications are operated on the client or via virtual machine.

A host is typically capable of running a number of virtual machines. The host typically ensures isolation between the virtual machines. Thus, a single host may provide the operating system logic for a number of remote clients. Each host has a hypervisor that uses underlying physical resources (such as network bandwidth, storage, memory, processing) to provide the appearance to the virtual machine as though the virtual machine has dedicated physical resources. This appearance is referred to as a virtual resource. Thus, each virtual machine may have virtual hard drives, virtual processors, virtual network bandwidth, virtual RAM and so forth.

A virtual network may also be provided by a hypervisor and offered up to one or more of the virtual machines running on the host, to give the appearance that those virtual machines are connected to a particular network (i.e., a virtual network). An underlying physical network actually facilitates communication between the corresponding hypervisors of the communicating virtual machines. However, these details are abstracted away from the view of the communicating virtual machines.

BRIEF SUMMARY

At least one embodiment described herein relates to the performance of multicast and/or broadcasting between virtual machines over a virtual network. A source hypervisor accesses a network message originated from a source virtual machine, and accesses a virtual network address associated with at least some of the destination virtual machines.

In some embodiments, the virtual network address may be expressly included in the network message, and may already correspond to a single destination address. Alternatively or in addition, a group virtual network address (such as a multicast or broadcast virtual network address) expressed within the network message may be resolved to multiple individual virtual network addresses. The resolving of the group virtual network address may be performed using an external address lookup service, although not required.

Using each resolved virtual network address, the hypervisor determines a physical network address of the corresponding hypervisor that supports the destination virtual machine, and also determines a unique identifier for the destination virtual machine. This might also be performed with the assistance of the external address lookup service, although not required.

The source hypervisor may then dispatch the network message along with the unique identifier for the destination virtual machine to the destination hypervisor over the physical network using the physical network address of the hypervisor. For instance, the source hypervisor might encapsulate the network message along with the unique identifier of the destination virtual machine. The encapsulation might include, for instance, the physical network address of the destination hypervisor that allows the communication to be routed to the destination hypervisor.

The destination hypervisor receives the communication, interprets the unique identifier to identify the destination virtual machine, and passes the network message to the destination virtual machine. This may be performed for each virtual network address that resolved to a destination virtual machine.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which:

FIG. 9 illustrates an address lookup service and the data that might be represented therein;

DETAILED DESCRIPTION

In accordance with embodiments described herein, the performance of multicast and/or broadcasting is described between virtual machines over a virtual network. A source hypervisor accesses a network message originated from a source virtual machine, and uses the network message to determine a virtual network address associated with destination virtual machines (after potentially resolving group virtual network addresses).

Using each virtual network address, the hypervisor determines a physical network address of the corresponding hypervisor that supports the destination virtual machine, and also determines a unique identifier for the destination virtual machine. This determination, as well as potentially resolution of group virtual network addresses, may be performed using an external address lookup service.

The source hypervisor may then dispatch the network message along with the unique identifier to the destination hypervisor over the physical network using the physical network address of the hypervisor. The destination hypervisor passes the network message to the destination virtual machine identified by the unique identifier.

Some introductory discussion of a computing system will be described with respect to FIG. 1. Then, the operation of virtual machines will be described with respect to FIG. 2. Subsequently, the principles of virtual machines multicasting and/or broadcasting in a virtual network will be described with respect to FIG. 3 and successive figures.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
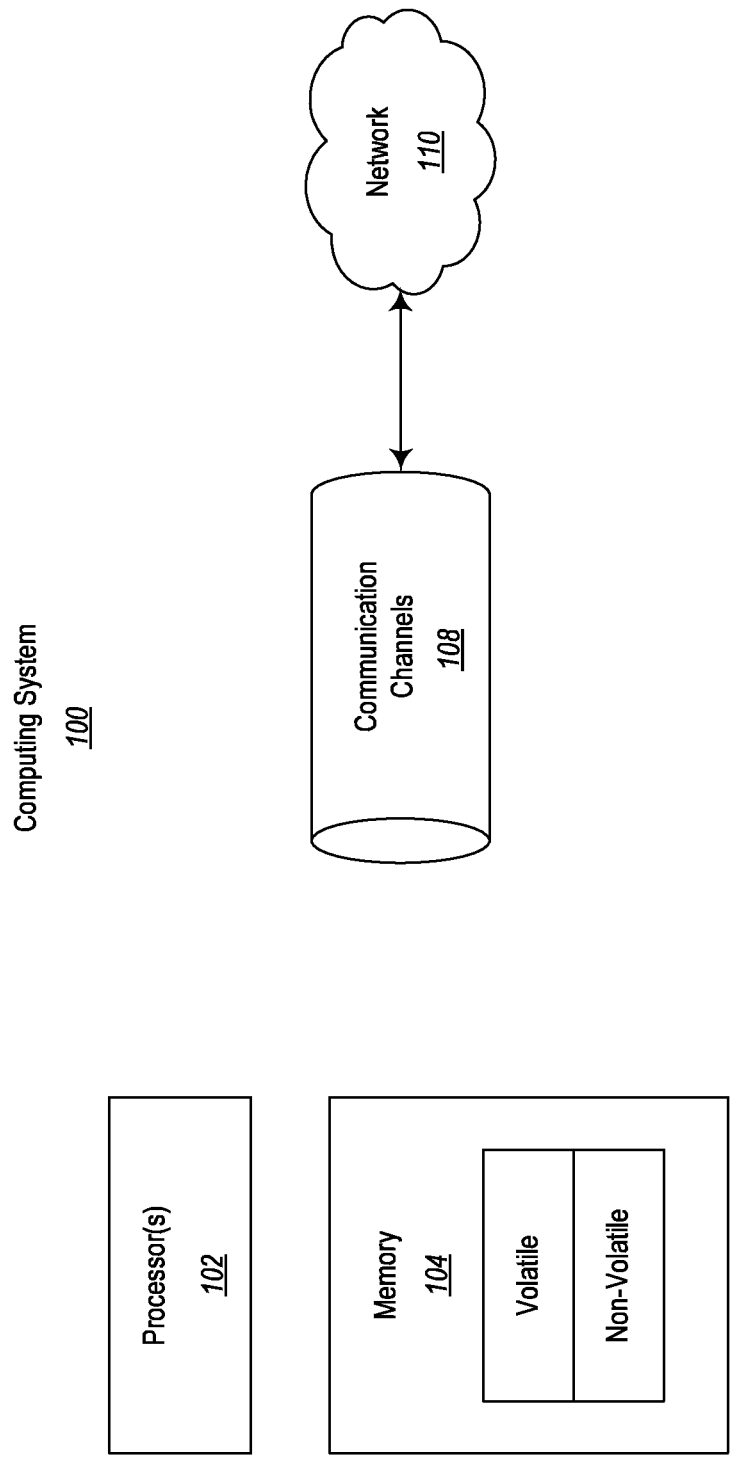
FIG. 1 abstractly illustrates a physical computing system in which some embodiments described herein may be employed.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
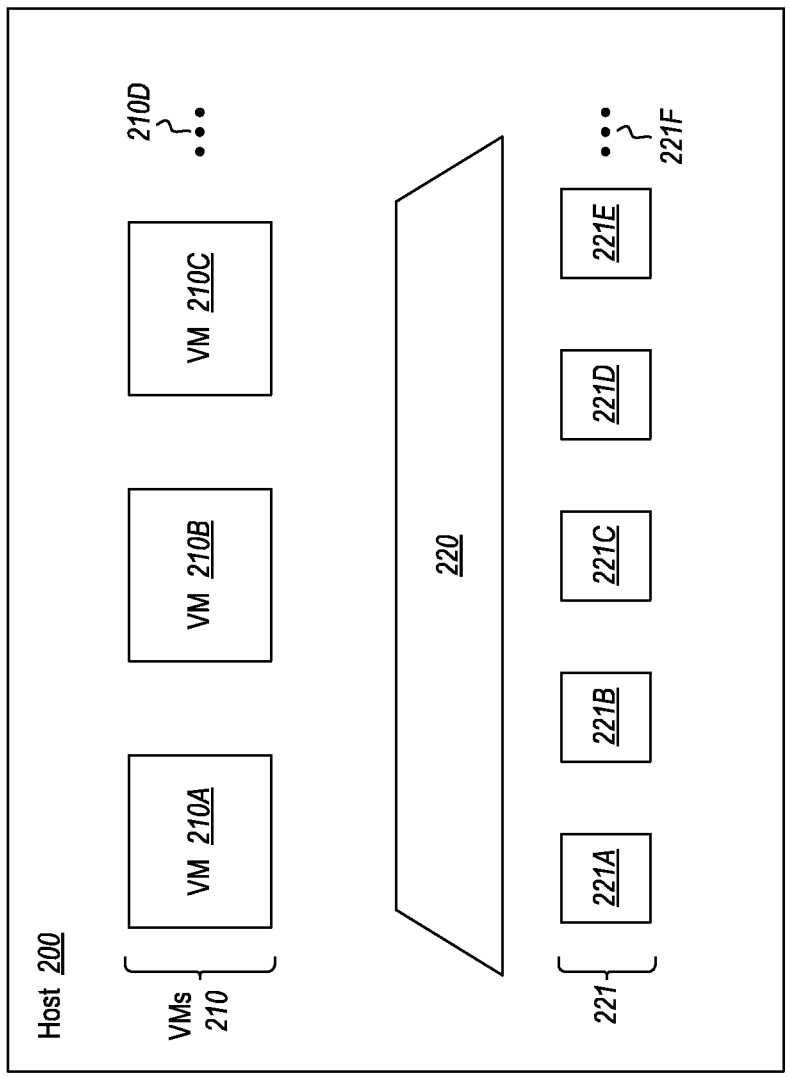
FIG. 2 abstractly illustrates a host computing system that hosts a number of virtual machines that are supported by a hypervisor and underlying physical resources.

Having described a physical computing system (or physical machine) with respect to FIG. 1, the concept of a virtual computing system (or virtual machine) will now be described. One type of physical computing system is termed a host computing system (or simply "host"). Each host is capable of running one or more, and potentially many, virtual machines. For instance, FIG. 2 abstractly illustrates a host 200 in further detail. In the case of FIG. 2, the host 200 is illustrated as operating three virtual machines 210 including virtual machines 210A, 210B and 210C. However, the ellipses 210D once again represents that the principles described herein are not limited to the number of virtual machines running on the host 200. There may be as few as zero virtual machines running on the host with the only upper limit being defined by the physical capabilities of the host 200.

During operation, the virtual machines emulates a fully operational computing system including an at least an operating system, and perhaps one or more other applications as well. Each virtual machine is assigned to a particular client, and is responsible to support the desktop environment for that client.

The virtual machine generates a desktop image or other rendering instructions that represent a current state of the desktop, and then transmits the image or instructions to the client for rendering of the desktop. As the user interacts with the desktop at the client, the user inputs are transmitted from the client to the virtual machine. The virtual machine processes the user inputs and, if appropriate, changes the desktop state. If such change in desktop state is to cause a change in the rendered desktop, then the virtual machine alters the image or rendering instructions, if appropriate, and transmits the altered image or rendered instructions to the client computing system for appropriate rendering. From the prospective of the user, it is as though the client computing system is itself performing the desktop processing.

The host 200 includes a hypervisor 220 that emulates virtual resources for the virtual machines 210 using physical resources 221 that are abstracted from view of the virtual machines 210. The hypervisor 221 also provides proper isolation between the virtual machines 210. Thus, from the perspective of any given virtual machine, the hypervisor 220 provides the illusion that the virtual machine is interfacing with a physical resource, even though the virtual machine only interfaces with the appearance (e.g., a virtual resource) of a physical resource, and not with a physical resource directly. In FIG. 2, the physical resources 221 are abstractly represented as including resources 221A through 221F. Examples of physical resources 221 including processing capacity, memory, disk space, network bandwidth, media drives, and so forth.

Figure 3:
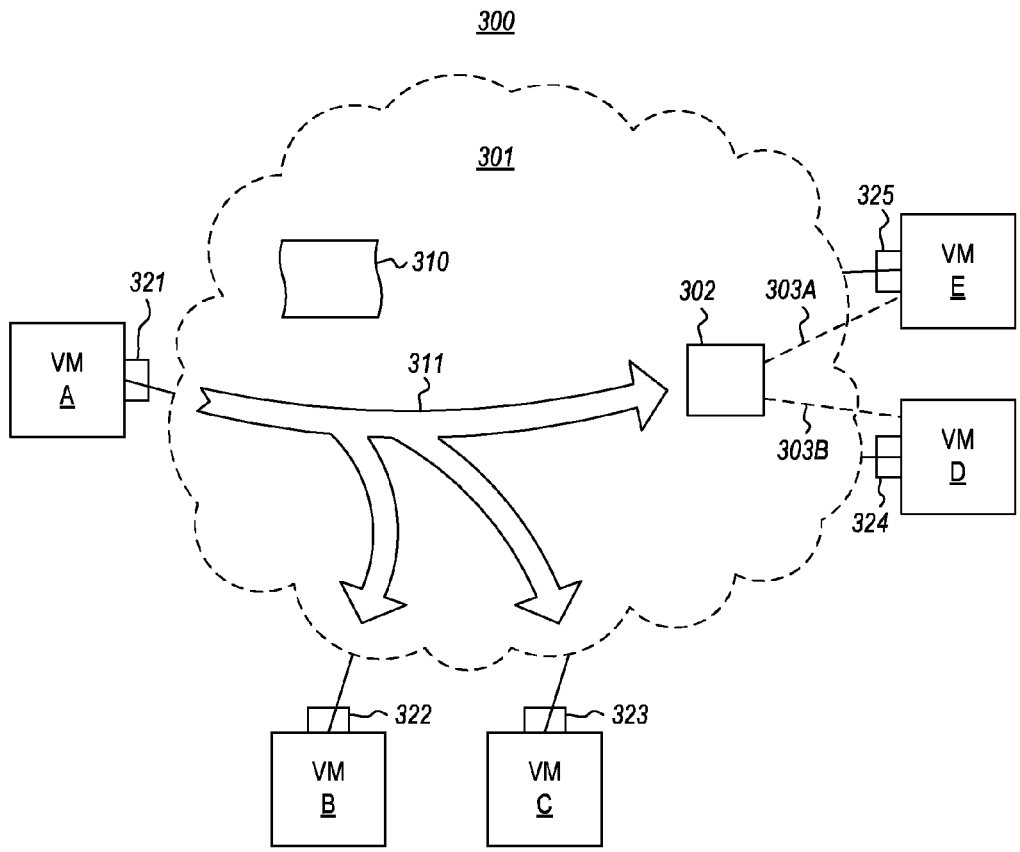
FIG. 3 abstractly illustrates a number of virtual machines communicating over a virtual network.

FIG. 3 illustrates a number of virtual machines labeled A through E communicating over a virtual network 301. Each of the virtual machines A through E has an associated virtual network address 321 through 325 that the virtual machines may use to communicate over the virtual network 301. The virtual network addresses described herein may each be, for example, virtual Internet Protocol (IP) addresses.

Figure 4:
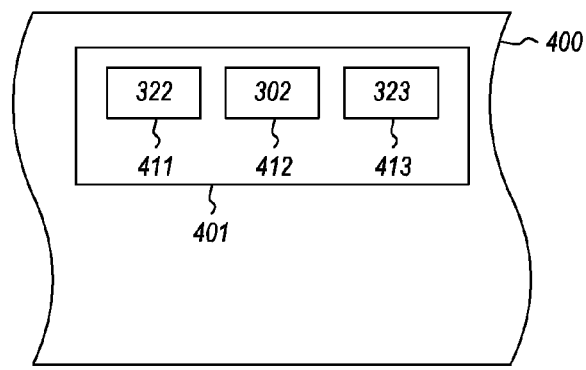
FIG. 4 abstractly illustrates a structure of a network message

Suppose that virtual machine A is to multicast a network message 310 to each of the other virtual machines B, C, D, E (as represented by the multi-headed arrow 311). FIG. 4 illustrates an example 400 of the network message 310 in further detail. The virtual machine A may construct network message 310 (e.g., network message 400), which includes a destination header 401 that expresses each of the virtual network addresses 411, 412 and 413. For instance, the destination header 401 may express the virtual network address of virtual machine B (which is 322), the virtual network address of virtual machine C (which is 323) and the network address of a group virtual network address that includes both virtual machines D and E (which is 302). The association between virtual machine D and the group virtual network address 302 is represented by dashed line 303B. Likewise, the association between virtual machine E and the group virtual network address 302 is represented by dashed line 303A. For instance, the group virtual network address 302 may be a multicast virtual network address or perhaps a broadcast virtual network address.

A multicast network address may, in some embodiments, be subscribed to be a virtual machine by registering for the multicast network address to add the virtual machine as a member of any network message received at the multicast network address. An associated deregistration request may deregister the virtual machine from the multicast virtual network address. A broadcast virtual network address is associated with a particular set of the virtual network (e.g., a subnet). Any network message received at the broadcast virtual network address is broadcasts to each of the virtual machines within that subnet.

Figure 5:
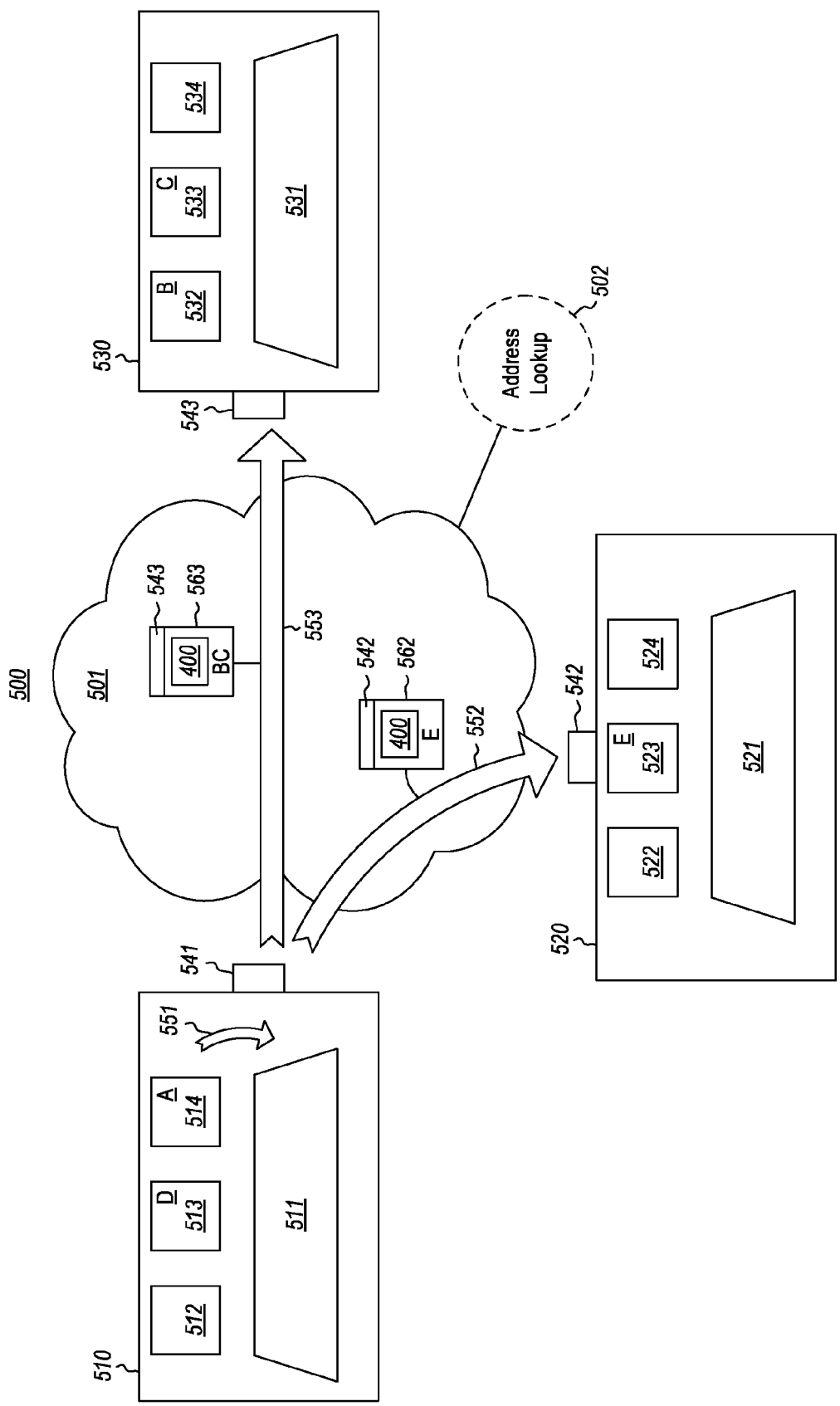
FIG. 5 abstractly illustrates a physical network environment that shows the five virtual machines of FIG. 3 in a physical network environment.

The virtual network 301 is "virtual" in the sense that the underlying physical network architecture (and associated physical addresses) are abstracted away from the view of each of the virtual machines A through E. For instance, FIG. 5 illustrates a physical network environment 500 that shows the five virtual machines A through E in their actual physical environment.

The physical network environment includes three hosts 510, 520 and 530 communicating over network 501. Each host has as a physical network address, an example of which being an actual IP address for the physical network 501. For instance, host 510 has associated physical network address 541, host 520 has associated physical network address 542, and host 530 has associated physical network address 543. Each of the hosts 510, 520 and 530 includes an associated hypervisor 511, 521 and 531 respectively.

Each host includes corresponding virtual machines. For instance, as an example only, host 510 operates virtual machine 512, 513 and 514; host 520 operates virtual machines 522, 523 and 524; and host 530 operates virtual machines 532, 533 and 534. Each virtual machine may have a unique identifier. For instance, virtual machine 513 has identifier D and corresponds to virtual machine D of FIG. 3, virtual machine 514 has identifier A and corresponds to virtual machine A of FIG. 3, virtual machine 523 has identifier E and corresponds to virtual machine E of FIG. 3, virtual machine 532 has identifier B and corresponds to virtual machine B of FIG. 3, and virtual machine 533 has identifier C and corresponds to virtual machine C of FIG. 3.

Thus, the actual physical configuration of the physical network 500 is much different than the abstracted view offered by the virtual network 300. The network addresses are different in the virtual network 300 than in the physical network 500, and further the virtual machines A through E need not be concerned about the underpinning physical network(s) that support the virtual network 300.

The physical network environment 500 also includes an address lookup service 502, which may operate as described further below. The implementation of the address lookup service 502 is not important to the more general principles described herein. The address lookup service 502 may be, for example, a cloud service, or perhaps a distributed application available on each of the hosts 510, 520 and 530. While the physical network environment shows three hosts, each having three virtual machine running thereon, this is just an example only. The principles described herein apply no matter how many hosts the physical network environment has, and no matter how many virtual machines operate on particular hosts.

Figure 6:
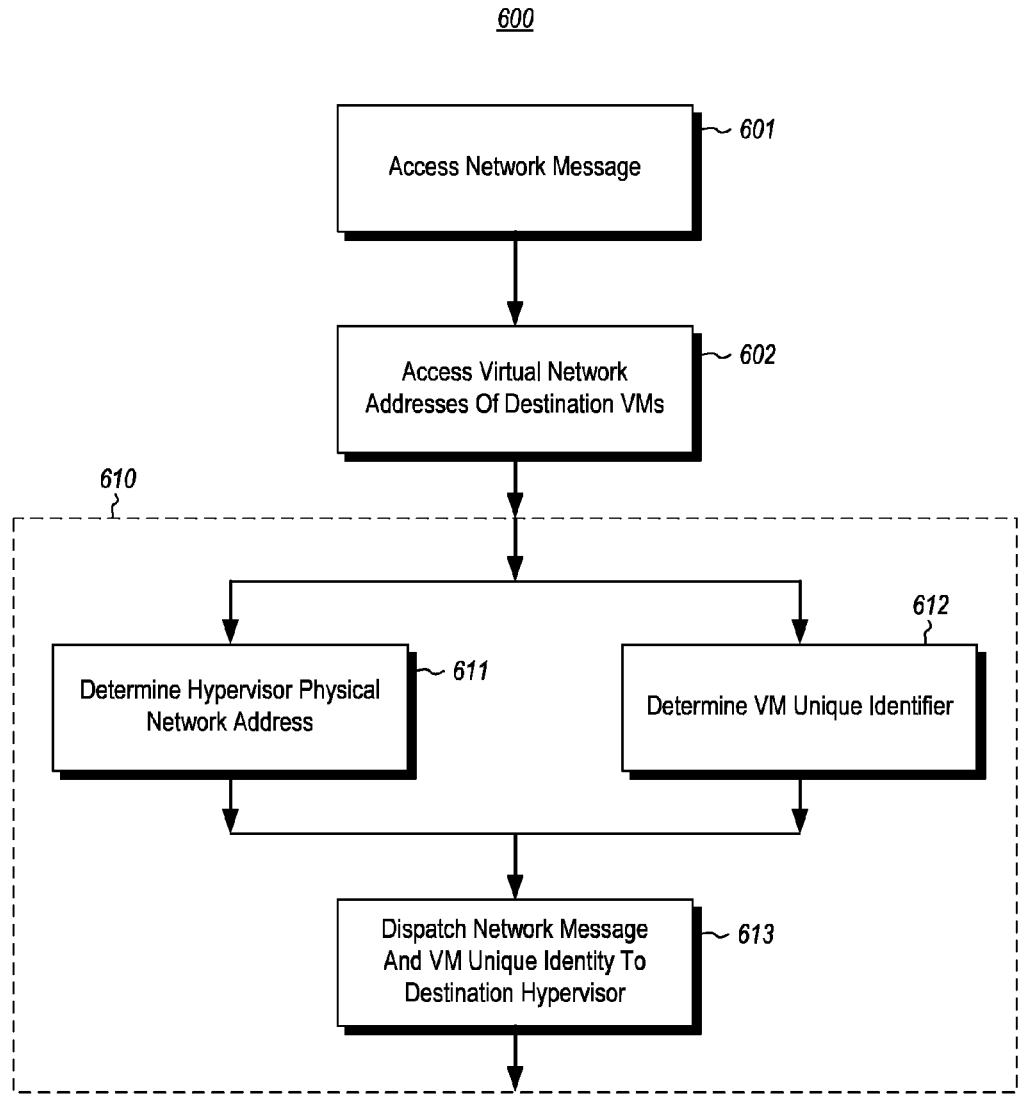
FIG. 6 illustrates a flowchart of a method of performing a virtualized multicast of a network message from the perspective of the source hypervisor, which dispatches a multicast network message.
Figure 7:
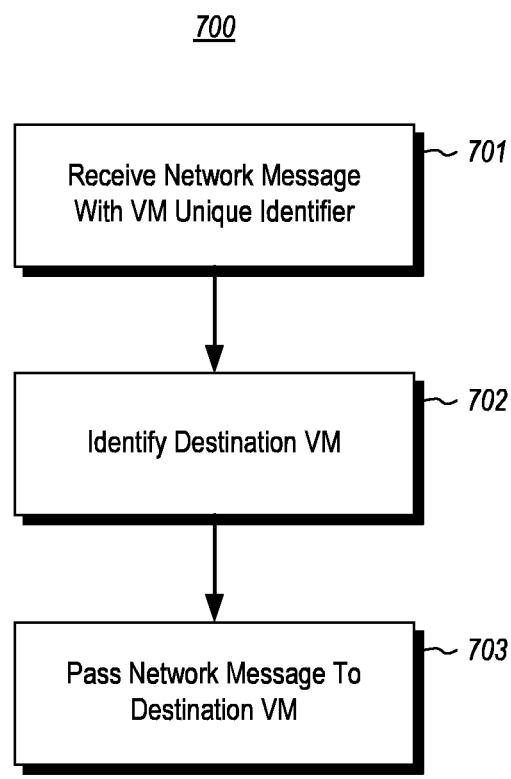
FIG. 7 illustrates a flowchart of a method of receiving and delivering a network message from the perspective of the destination hypervisor.

FIG. 6 illustrates a flowchart of a method 600 of performing a virtualized multicast of a network message from the perspective of the source hypervisor, which dispatches a multicast network message. FIG. 7 illustrates a flowchart of a method 700 of receiving and delivering a network message from the perspective of the destination hypervisor. As an example, the methods 600 and 700 may be performed to facilitate the multicasting 311 of the network message 310 (e.g., message 400) over the virtual network 300, which of course involves operations at the physical level of the physical network environment 500 of FIG. 5. Accordingly, FIGS. 6 and 7 will now be described with frequent reference to FIGS. 3 through 5.

Referring to FIG. 6, the source hypervisor accesses a network message originated from a source virtual machine (act 601). Referring to FIG. 3, the source virtual machine may be virtual machine A, and the network message may be network message 310, an example of which being the network message 400 of FIG. 4. At the physical network level referring to FIG. 5, the source hypervisor 511 access the network message from virtual machine 514 (i.e., virtual machine A) as represented by arrow 551.

The source hypervisor then access a virtual network address associated with each of the destination virtual machines (act 602). For instance, referring to FIGS. 4, the virtual network addresses in the destination header 401 specify both individual virtual network addresses and group virtual network addresses. Individual virtual network addresses are addresses that are assigned specifically to an individual virtual machine (such as virtual machine addresses 321 through 325 in FIG. 3). Group network addresses are addresses that may be assigned to multiple virtual machines (such as group virtual network address 302 in FIG. 3).

Figure 8:
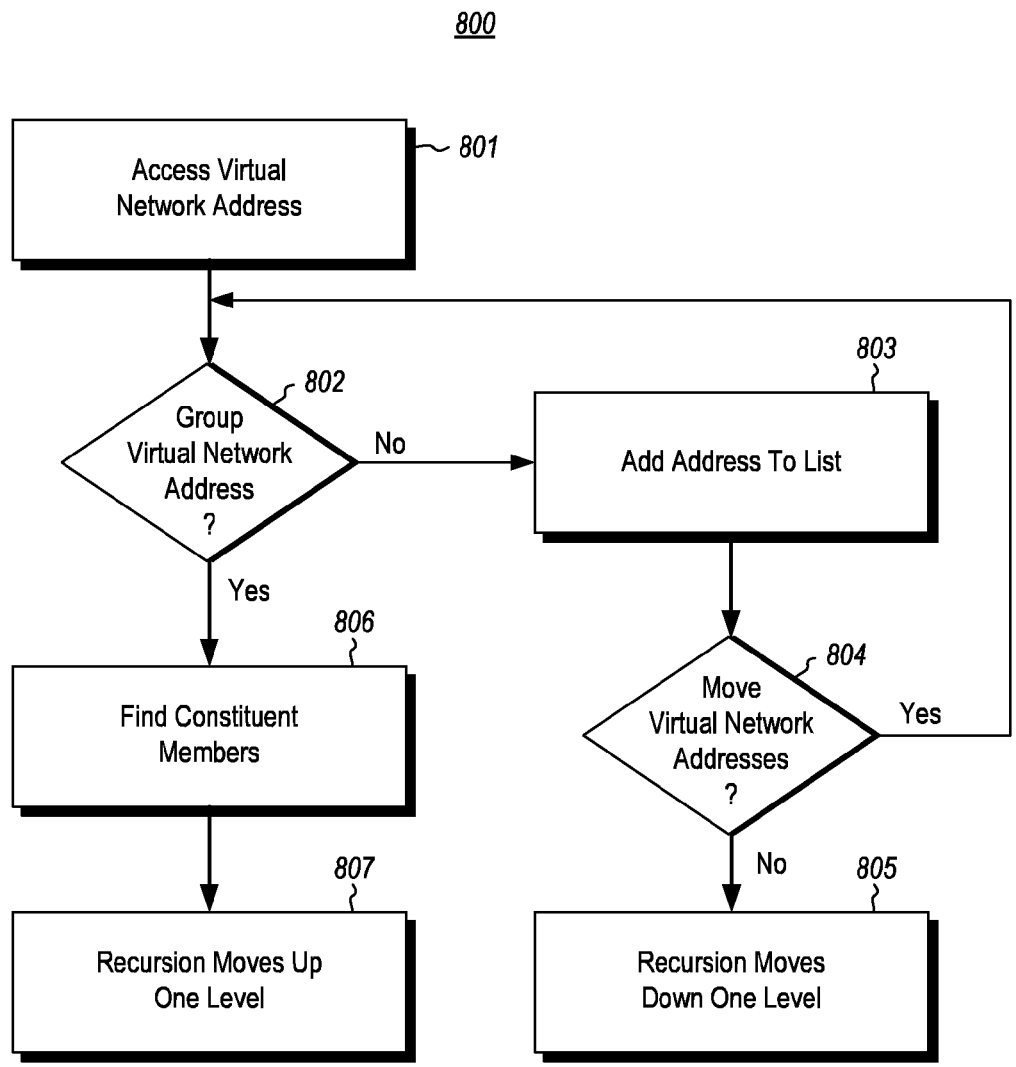
FIG. 8 illustrates a flowchart of a method for accessing a virtual network address associated with each of a plurality of destination virtual machines at least indirectly addressed by the network message.

FIG. 8 illustrates a flowchart of a method 800 for accessing a virtual network address associated with each of a plurality of destination virtual machines at least indirectly addressed by the network message. The method 800 may be performed in order to accomplish act 602 of FIG. 6. The method 800 is recursive but at the zero'th level of recursion (before any recursion of the method 800 is performed), the method 800 is performed for each of the virtual network addresses expressed within the network message. For instance, in the case of FIG. 4, at the zero'th level of recursion, the method 800 may be performed for each of the virtual network addresses 411 through 413 expressed within the network message 400.

Beginning with virtual network address 411, the source hypervisor 511 access the virtual network address 411 (which is 322—the virtual network address of virtual machine B). This corresponds to act 801 in FIG. 8. The method 800 then branches depending on whether or not the accessed virtual network address is a group virtual network address (decision block 802). In the case of virtual network address 411, the virtual network address 411 is an individual virtual network address ("No" in decision block 802). Accordingly, the virtual network address 411 is added to a list (act 803) (e.g., 322 is added to the list). At the zero'th level of recursion, there are more virtual network addresses to be evaluated ("Yes" in decision block 804) since there are more virtual network addresses expressed within the network message 400. Accordingly, the method 800 returns to access the network virtual network address expressed in the network message 400.

The source hypervisor 511 accesses the virtual network address 412 (which is 302) (act 801). This is a group virtual network address ("Yes" in decision block 802), and so the constituent virtual network addresses of the group virtual network address are found (act 806). In one embodiment, this may be performed by uses the address lookup service 502 of FIG. 5. FIG. 9 illustrates an address lookup service 900 and the data that might be represented therein. Here, there is a group virtual network address correlation table 902 that correlates the group virtual network address 302 with its constituent virtual network address. In this case, the constituent virtual network address are virtual network address 324 (corresponding to virtual machine D) and virtual network address 325 (corresponding to virtual machine E). The method 800 then moves up one level of recursion to the $1^{st}$ level of recursion (act 807).

The method 800 then begins at the $1^{st}$ level of recursion. When operating at an "n"th level of recursion (where n is a positive integer), the method 800 may be performed for each of the constituent virtual network addresses that were discovered by the group virtual network address that caused the higher level recursion. In other words, for this $1^{st}$ level of recursion, the method 800 is performed for each of virtual network address 324 and 325.

Beginning with virtual network message 324, the source hypervisor 511 accesses the virtual network address 324 (act 801). Since this is an individual virtual network address ("No" in decision block 802), the virtual network address 324 is added to the list (act 804). Thus, the list now includes addresses 322 and 324. There are more virtual network addresses to be evaluated at this level of recursion ("Yes" in decision block 804), and thus the method returns to act 801.

The next virtual network address at this $1^{st}$ level of recursion is accessed (act 801). This would be virtual network address 325. This is an individual virtual network address ("No" in decision block 802), and thus this virtual network address 325 is also added to the list (act 803). Thus, at this stage, the list includes virtual network addresses 322, 324 and 325. There are no more virtual network address to evaluate at this $1^{st}$ level of recursion ("No" in decision block 804), and thus the recursion moves down one level to the zero'th level of recursion (act 805). Thus, the method 800 continues at the zero-th level of recursion where it last level off before entering the $1^{st}$ level of recursion.

Continuing with virtual network message 413, the source hypervisor 511 accesses the virtual network address 413 (which is 323—the virtual network address of virtual machine C) (act 801). Since this is an individual virtual network address ("No" in decision block 802), the virtual network address 413 is added to a list (act 803) (e.g., 323 is added to the list). Accordingly, at this stage, there are four virtual network addresses 322 through 325 in the list. There are no more virtual network addresses to evaluate ("No" in decision block 805), and thus the recursion moves down one level (act 805), which means the method 800 ends in the case of already being at the zero'th level of recursion.

Returning, to FIG. 6, the act 602, implemented by recursively performing method 800 on the virtual network addresses expressed in the destination header 401 of the network message 400 results in the virtual network addresses 322 through 325 being identified (act 602). The contents of dashed-lined box 610 are then performed for each of the identified destination virtual machines. However, the principles described also apply if the contents of box 610 are performed for only a subset or even just one of the identified virtual network addresses.

For each virtual network address, the source hypervisor 511 uses the associated virtual network address to determine a hypervisor physical network address for a destination hypervisor that supports the destination virtual machine (act 611). In addition, the associated virtual network address may be used to determine a unique identifier for the associated destination virtual machine (act 612). Although not required, this may be determined using the address lookup service 502 of FIG. 5. Referring to FIG. 9, the individual virtual network address table 901 shows various entries 901A through 901E in which the hypervisor physical network address associated with each of the virtual network addresses is revealed, and in which the unique identifier of each destination virtual machine associated with each virtual network address is revealed.

For instance, for virtual network address 322, the hypervisor physical network address is 543 and the virtual machine unique identifier is B. For virtual network address 323, the hypervisor physical network address is again 543 and the virtual machine unique identifier is C. For virtual network address 324, the hypervisor physical network address is 541 (the same hypervisor as the source virtual machine) and the virtual machine unique identifier is D. For virtual network address 325, the hypervisor physical network address is 542 and the virtual machine unique identifier is E.

For each virtual network address, the source hypervisor 511 then uses the hypervisor physical network address to dispatch the network message to the destination hypervisor along with the unique identifier for the destination virtual machine (act 613).

In the case of virtual network address 324, the source hypervisor 511 may simply uses the hypervisor physical network address to recognize that no physical dispatch over the physical network 501 is necessary.

In the case of virtual network address 325, the source hypervisor 511 will physically dispatch a communication over the physical network 501 since the destination hypervisor 521 is not the same as the source hypervisor 511. Accordingly, the communication is addressed using hypervisor physical network address 542, and includes the original network message (e.g., network message 400) as well as the unique identifier E. This communication is represented in FIG. 5 by arrow 552 and message 562.

In the case of virtual network addresses 322 and 323, the source hypervisor 511 may physically dispatch a single communication over the physical network 501 since the destination hypervisor 531 is the same for the virtual machines represented by both virtual network addresses 322 and 323. Accordingly, the communication is addressed using hypervisor physical network address 542, and includes the original network message (e.g., network message 400) as well as the unique identifiers B and C. This communication is represented in FIG. 5 by arrow 553 and message 563.

FIG. 7 illustrates a flowchart of method 700 for the destination virtual machine routing the network message. Each destination hypervisor will perform the method 700 upon receiving the communication that includes the network message 400 and the one or more unique identifiers that uniquely identify the virtual machine. For instance, for virtual machines B and C, the destination hypervisor 531 accesses the communication 463, uses the unique identifiers B and C to identify the destination virtual machines 532 and 533 (act 702), and then provides or passes the network message 400 to the virtual machine 532 and 533 (act 703). For virtual machine D, after the source hypervisor 511 recognizes itself as the destination hypervisor (act 701), the unique identifier D is used to identify virtual machine 513 as a destination virtual machine (act 702), and the message 400 is passed to the virtual machine D (act 703). For virtual machine E, the destination hypervisor 521 accesses the communication 462, uses the unique identifier E to identify the destination virtual machine 523 (act 702), and then provides or passes the network message 400 to the virtual machine 523 (act 703).

From the virtual network perspective in FIG. 3, the virtual machine A has been able to perform the multicast 311 of the network message 300, and the complex underpinnings of how this was accomplished using the physical network environment 500 are abstracted away from the view of the virtual machines A through E.

Figure 10:
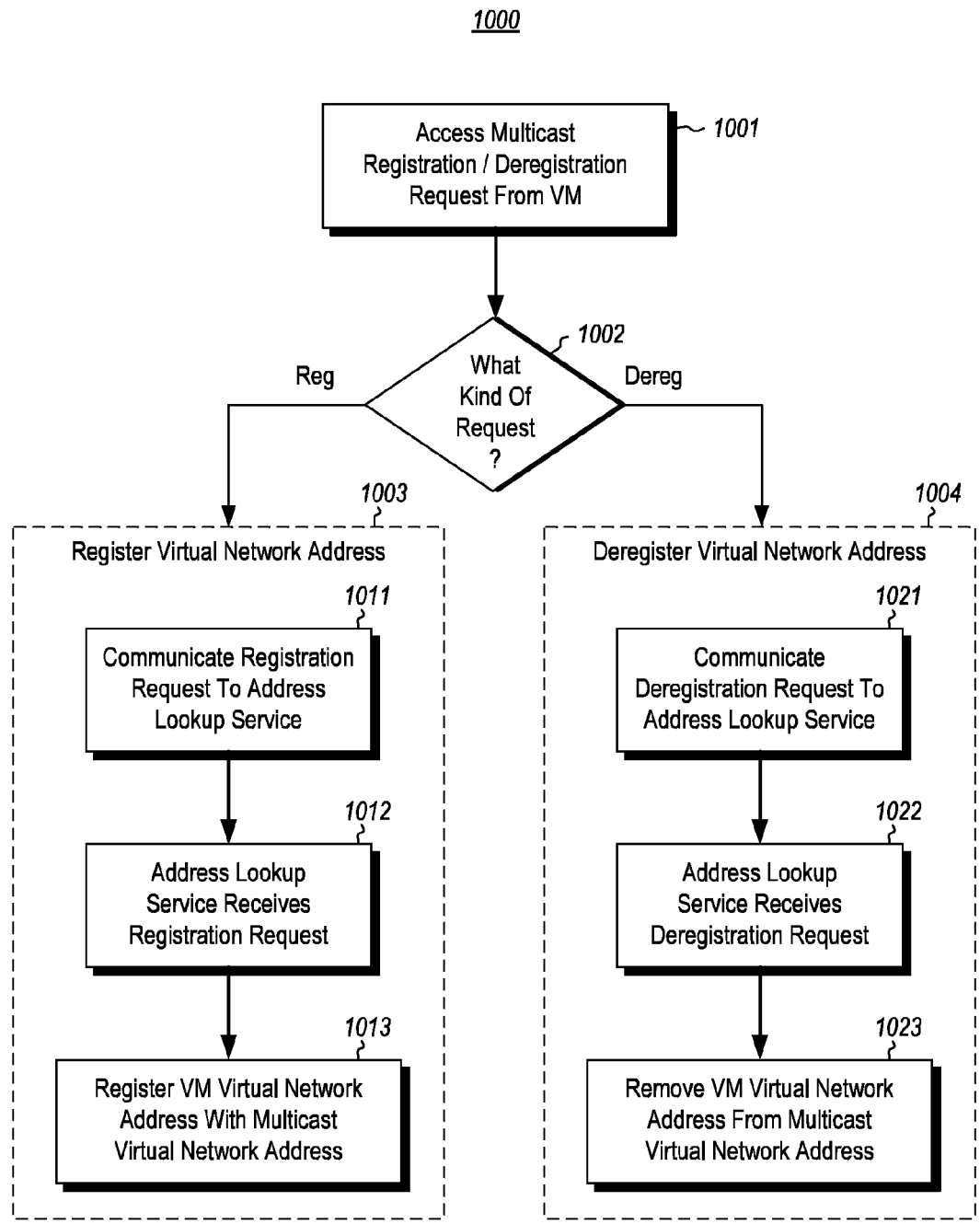
FIG. 10 illustrates a flowchart of a method for updating a multicast group virtual network address.

As previously mentioned, the group virtual network address 302 may be a multicast virtual network address. FIG. 10 illustrates a flowchart of a method 1000 for updating a multicast group virtual network address. The method 1000 may be performed by any of the hypervisors that receive a registration or deregistration request from one or their virtual machines.

The hypervisor that supports the virtual machine accesses a multicast registration or deregistration multicast registration request from the virtual machine (act 1001). The method 1000 then branches depending on whether the request is a registration request or a deregistration request (decision block 1002).

If the request is a registration request ("Reg" in decision block 1002), the hypervisor registers the virtual network address with group virtual network address (act 1003). For instance, the hypervisor communicates the multicast registration request to the address lookup service 502 (act 1011). The address lookup service receives the multicast registration request, (act 1012), and responds to the multicast registration request by registering a virtual network address associated with the virtual machine with the multicast virtual network address (act 1013).

For instance, in order for virtual machine D to be added to the multicast virtual network address 302 (as represented by dashed line 303B), the virtual machine D dispatches the registration request into the virtual network 301. This registration request is intercepted by the associated hypervisor 511, which routes the registration request to the address lookup service 502. Likewise, in order to virtual machine E to be added to the multicast virtual network address 302 (as represented by dashed line 303A), the virtual machine E dispatches the registration request into the virtual network 301. This registration request is intercepted by the associated hypervisor 521, which routes the registration request to the address lookup service 502.

If the request is a deregistration request ("Dereg" in decision block 1002), the hypervisor deregisters the virtual network address from group virtual network address (act 1004). For instance, hypervisor communicates the multicast deregistration request to the address lookup service 502 (act 1021). The address lookup service receives the multicast deregistration request, (act 1022), and responds to the multicast deregistration request by removing a virtual network address associated with the second virtual machine from being associated with the multicast virtual network address (act 1023).

Although not required, in one embodiment, the physical network environment 500 may be structured as the environment 1100. The environment 1100 includes multiple clients 1101 interacting with a system 1110 using an interface 1102. The environment 1100 is illustrated as having three clients 1101A, 1101B and 1101C, although the ellipses 1101D represent that the principles described herein are not limited to the number of clients interfacing with the system 1110 through the interface 1102. The system 1110 may provide services to the clients 1101 on-demand and thus the number of clients 1101 receiving services from the system 1110 may vary over time.

Each client 1101 may, for example, be structured as described above for the computing system 100 of FIG. 1. Alternatively or in addition, the client may be an application or other software module that interfaces with the system 1110 through the interface 1102. The interface 1102 may be an application program interface that is defined in such a way that any computing system or software entity that is capable of using the application program interface may communicate with the system 1110.

The system 1110 may be a distributed system, although not required. In one embodiment, the system 1110 is a cloud computing environment. Cloud computing environments may be distributed, although not required, and may even be distributed internationally and/or have components possessed across multiple organizations.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Figure 11:
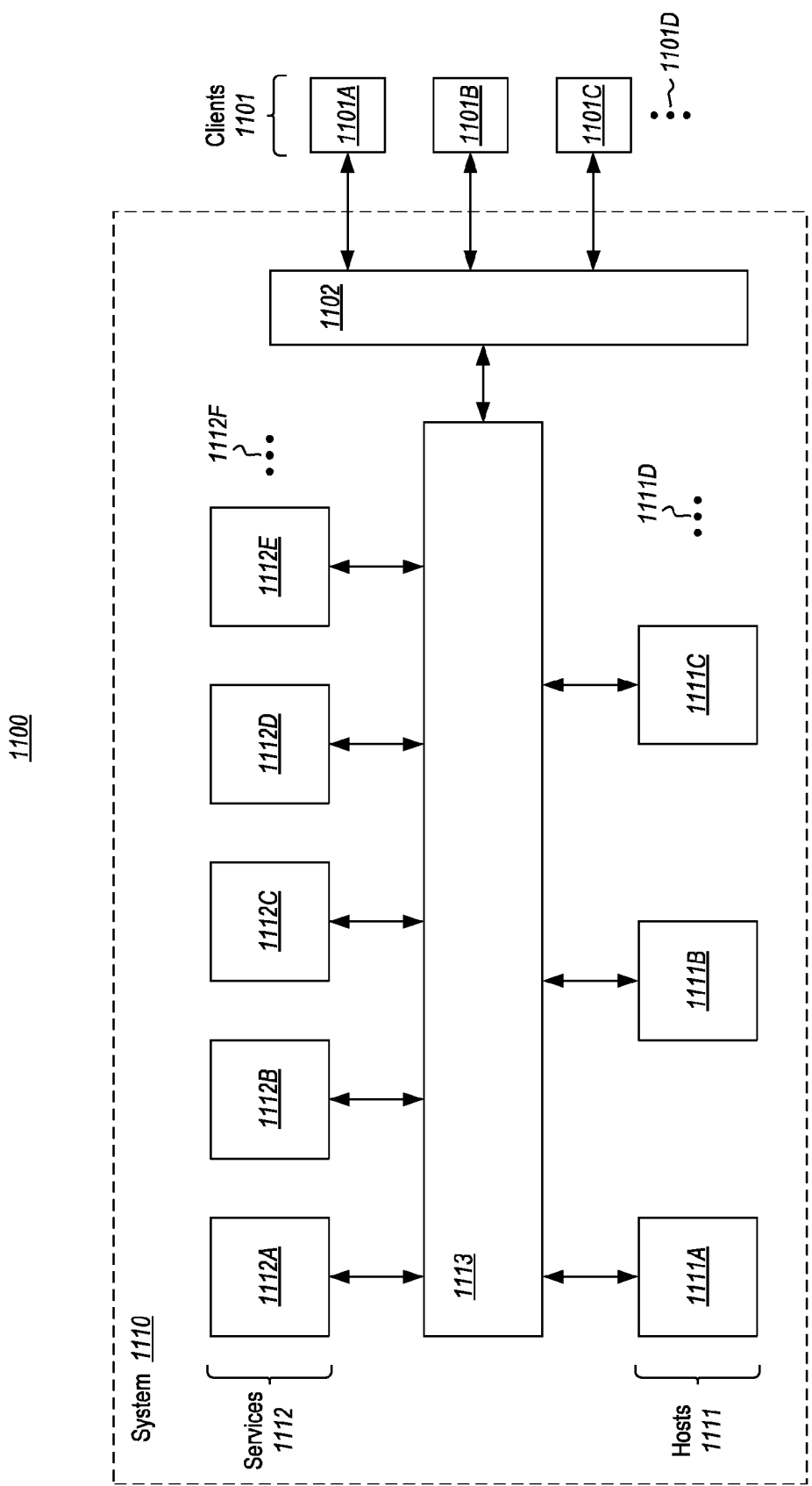
FIG. 11 illustrates an example cloud computing environment.

The system 1110 includes multiple hosts 1111, that are each capable of running virtual machines. Although the system 1100 might include any number of hosts 1111, there are three hosts 1111A, 1111B and 1111C illustrated in FIG. 11, with the ellipses 1111D representing that the principles described herein are not limited to the exact number of hosts that are within the system 1110. There may be as few as one, with no upper limit. Furthermore, the number of hosts may be static, or might dynamically change over time as new hosts are added to the system 1110, or as hosts are dropped from the system 1110. Each of the hosts 1111 may be structured as described above for the computing system 100 of FIG. 1. The hosts 1111A, 1111B and 1111C may be, for example, the hosts 510, 520 and 530 of FIG. 5.

Referring back to FIG. 11, the system 1112 also includes services 1112. In the illustrated example, the services 1100 include five distinct services 1112A, 1112B, 1112C, 1112D and 1112E, although the ellipses 1112F represent that the principles described herein are not limited to the number of service in the system 1110. A service coordination system 1113 communicates with the hosts 1111 and with the services 1112 to thereby provide services requested by the clients 1101, and other services (such as authentication, billing, and so forth) that may be prerequisites for the requested service. In one embodiment, the service 1112A is the address lookup service 502 of FIG. 5. Thus, the principles described herein may, but need not, be performed in a cloud computing environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   at least one processor; and
   one or more storage device having stored computer-executable instructions which, when executed by the at least one processor, implement a method of processing and transmitting a network message from a source virtual machine to one or more destination virtual machine, the method comprising:
   an act of accessing a network message from a source virtual machine that is addressed to at least one destination virtual machine;
   an act of identifying a virtual network address for each of the at least one destination virtual machine referenced by the network message;
   for each identified virtual network address, performing the following:

an act of using the identified virtual network address to determine a unique identifier for a corresponding destination virtual machine;

subsequent to identifying the identified virtual network address, an act of using the identified virtual network address to determine a physical network address of a network management component that manages the at least one destination virtual machine; and subsequent to identifying the identified virtual network address, an act of using the physical network address of the network management component to route the network message to the network management component along with the unique identifier for the corresponding destination virtual machine, by at least encapsulating the network message with the physical network address or otherwise adding the physical network address to the network message, wherein the unique identifier is used, rather than the virtual network address of the destination virtual machine, to further route the network message from the network management component to the corresponding destination virtual machine.

2. The computing system in accordance with claim 1, wherein the network management component is a hypervisor.

3. The computing system in accordance with claim 2, wherein the hypervisor is a source hypervisor of the source virtual machine and a destination hypervisor of the destination virtual machine.

4. The computing system in accordance with claim 2, wherein the source hypervisor and the destination hypervisor are different hypervisors on different host computing systems.

5. The computing system in accordance with claim 1, wherein the virtual network address is associated with a plurality of different unique identifiers, such that the act of using the identified virtual network address to determine the unique identifier for the corresponding destination virtual machine includes using the identified virtual network address to determine a plurality of unique identifiers for a plurality of corresponding destination virtual machines, and wherein the plurality of unique identifiers are used to route the message to the plurality of corresponding destination virtual machines.

6. The computing system in accordance with claim 1, wherein an address lookup service is used to determine the unique identifier.

7. The computing system in accordance with claim 1, wherein an address lookup service is used to determine the physical network address of the network management component that manages the at least one destination virtual machine.

8. The computing system in accordance with claim 1, wherein the virtual network address is a subnet broadcast virtual network address.

9. The computing system in accordance with claim 1, wherein the virtual network address is a virtual IP address, and the physical network address is a hypervisor physical IP address.

10. A computing system comprising:
at least one processor; and
one or more storage device having stored computer-executable instructions which, when executed by the at least one processor, implement a method of processing and transmitting a network message from a source virtual machine to one or more destination virtual machine, the method comprising:

an act of accessing a network message from a source virtual machine that is addressed to at least one destination virtual machine;

an act of identifying at least one virtual network address for at least one destination virtual machine;

subsequent to identifying the at least one virtual network address, an act of determining one or more identifier associated with the at least one destination virtual machine and that is distinguished from the virtual network address; and subsequent to identifying the at least one virtual network address, an act of determining and using a physical network address of a hypervisor to route the message along with the one or more identifier to the hypervisor by at least encapsulating the network message with the physical network address or otherwise adding the physical network address to the network message, wherein the one or more identifier is subsequently used by the hypervisor to route the message to the at least one destination virtual machine rather than the virtual network address of the virtual machine.

11. The computing system in accordance with claim 10, wherein the at least one virtual network address includes a plurality of virtual network addresses, including a group virtual network address as well as a non-group virtual network address and wherein said determining the one or more identifier associated with the at least one destination virtual machine includes identifying a first identifier for the non-group virtual network address and a plurality of identifiers for the group virtual network address.

12. The computing system in accordance with claim 10, wherein the accessing, identifying and determining is performed by the hypervisor.

13. The computing system in accordance with claim 10, wherein at least one of the accessing, identifying or determining is performed by a different host computer than a host computer of the hypervisor.

14. The computing system in accordance with claim 10, wherein a table is used for performing said determining the one or more identifier.

15. The computing system in accordance with claim 10, wherein a table is used for determining the physical network address of the hypervisor.

16. A computing system comprising:
at least one processor; and
one or more storage device having stored computer-executable instructions which, when executed by the at least one processor, implement a method of processing and transmitting a network message from a source virtual machine to one or more destination virtual machine, the method comprising:

an act of accessing a network message from a source virtual machine that is addressed to at least one destination virtual machine;

an act of identifying at least one virtual network address for at least one destination virtual machine, the at least one virtual network address including a plurality of virtual network addresses, including a group virtual network address as well as a non-group virtual network address;

an act of determining one or more identifier associated with the at least one destination virtual machine and that is distinguished from the virtual network address, by at least identifying a first identifier for the non-group virtual network address and a plurality of identifiers for the group virtual network address; and an act of using a physical network address of a hypervisor to route the message along with the one or more identifier to the hypervisor, wherein the one or more identifier is subsequently used by the hypervisor to route the message to the at least one destination virtual machine rather than the virtual network address of the virtual machine.

17. The computing system in accordance with claim 16, wherein the accessing, identifying and determining is performed by the hypervisor.

18. The computing system in accordance with claim 16, wherein at least one of the accessing, identifying or determining is performed by a different host computer than a host computer of the hypervisor.

19. The computing system in accordance with claim 16, wherein a table is used for performing said determining the one or more identifier.

20. The computing system in accordance with claim 16, wherein a table is used for determining the physical network address of the hypervisor.

\* \* \* \* \*